(12) United States Patent
Walker

(10) Patent No.: US 6,845,860 B1
(45) Date of Patent: Jan. 25, 2005

(54) CONVEYOR TRANSFER APPARATUS

(75) Inventor: Eugene W. Walker, Moxee, WA (US)

(73) Assignee: ARR Tech, Inc., Yakima, WA (US)

( * ) Notice: Subject to any disclaimer, the term of this patent is extended or adjusted under 35 U.S.C. 154(b) by 0 days.

(21) Appl. No.: 10/783,579

(22) Filed: Feb. 20, 2004

(51) Int. Cl.⁷ .......................... B65G 47/66; B65G 47/53
(52) U.S. Cl. ...................... 198/433; 198/809; 198/817; 198/601; 414/790.3; 99/443 C
(58) Field of Search ........................... 198/370.07, 433, 198/601, 607, 809, 817; 414/790.3; 99/443 R–443 C

(56) References Cited

U.S. PATENT DOCUMENTS

| | | | |
|---|---|---|---|
| 4,006,831 A | | 2/1977 | Jimenez |
| 4,262,792 A | | 4/1981 | Davies |
| 4,405,186 A | * | 9/1983 | Sandberg et al. ............. 414/21 |
| 4,431,104 A | | 2/1984 | Orlowski et al. |
| 4,516,210 A | | 5/1985 | Dahlke |
| 4,517,784 A | | 5/1985 | Beckett |
| 4,530,632 A | | 7/1985 | Sela |
| 4,951,803 A | | 8/1990 | Dorner et al. |
| 5,035,134 A | | 7/1991 | Fisch |
| 5,253,762 A | | 10/1993 | Duncan |
| 5,271,489 A | | 12/1993 | Helmstetter |
| 5,388,746 A | | 2/1995 | Hatchell et al. |
| 5,611,418 A | | 3/1997 | Helmstetter |
| 5,711,179 A | | 1/1998 | Kimball |
| 5,720,593 A | | 2/1998 | Pleake |
| 5,842,557 A | | 12/1998 | Montemayor et al. |
| 6,053,695 A | | 4/2000 | Longoria et al. |
| 6,209,708 B1 | | 4/2001 | Philipp et al. |
| 6,332,749 B1 | | 12/2001 | Garcia-Balleza et al. |
| 6,454,518 B1 | | 9/2002 | Garcia-Balleza et al. |
| 6,513,649 B1 | | 2/2003 | Lauzon et al. |
| 6,520,734 B2 | * | 2/2003 | Longoria et al. ........... 414/790 |
| 6,585,477 B1 | | 7/2003 | Lawrence |
| 6,634,483 B1 | | 10/2003 | Longoria |

* cited by examiner

Primary Examiner—Eileen D. Lillis
Assistant Examiner—Mark A. Deuble
(74) Attorney, Agent, or Firm—Christensen O'Connor Johnson Kindness PLLC

(57) ABSTRACT

A conveyor transfer apparatus (100) conveys stacks of product (S1) on a multi-row conveyor (110) having a plurality of parallel, spaced-apart belts (112) toward a single-row conveyor (120) oriented transversely to the multi-row conveyor. When a stack is in a desired position, an elevator assembly (130) lifts the stack above the multi-row conveyor to a position near the single-row conveyor. The elevator assembly includes a plurality of elongate members (136) that are sized and spaced to move between adjacent belts of the multi-row conveyor. A pusher assembly (140) extends to push the lifted stack from the elevator assembly onto the single row conveyor. The elevator assembly and pusher assembly then retract until another stack is in position to be lifted. A plurality of elevator assemblies and pusher assemblies are arranged to engage particular rows of stacks.

24 Claims, 7 Drawing Sheets

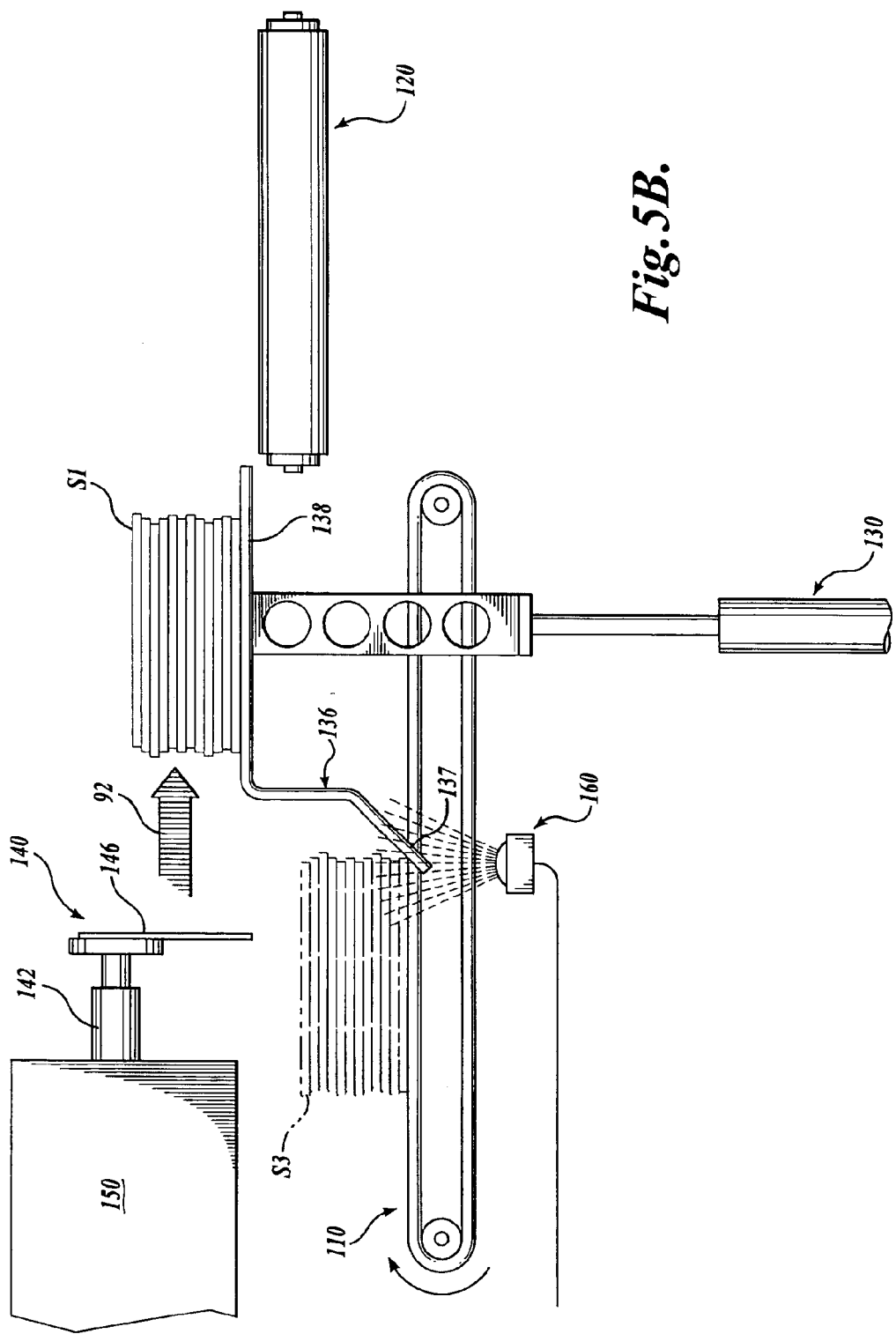

CONVEYOR TRANSFER APPARATUS

FIELD OF THE INVENTION

The present invention relates to food processing equipment and, in particular, to systems for moving stacked food product in a production environment.

BACKGROUND OF THE INVENTION

Tortilla production and sales is a large industry, by industry estimates, accounting for over five billion dollars in sales in 2002. The production of flat food products, such as tortillas, like much of the commercial food industry, conventionally requires significant manual labor that is repetitive and boring, and may lead to injuries, such as repetitive motion injuries or injuries related to worker inattention around moving and/or hot equipment. Moreover, the use of manual labor for repetitive tasks underutilizes resources and is economically inefficient. For these reasons, the food production industry has turned increasingly to technology to eliminate or reduce tasks that are amenable to automation, freeing the human resources for more appropriate tasks.

The production of flat food products presents special challenges. For example, tortillas are generally cooked in a continuous process, wherein the tortillas are transported on a moving conveyor through a conveyor oven, the tortillas being arranged in a number of rows as they pass through the oven. Typically, the tortillas are subsequently accumulated into stacks—for example, 10 to 20 tortillas high (or more)—so that the tortillas can be inserted into bags. Examples of a counting, inspecting, and/or stacking apparatus are disclosed in U.S. Pat. No. 4,530,632, issued to Sela, and U.S. Pat. No. 5,720,593, issued to Pleake, both of which are hereby incorporated by reference. In the apparatus disclosed by Pleake, the tortillas are fed from a conveyor into a trajectory guide and flung through a known flight trajectory to a stacking mechanism. A shaker jostles the stack of tortillas on a movable stack plate, which is lowered to deposit the stack onto a baseplate, wherein a stack removal device moves the stack of tortillas away from the stacking assembly. The stacks of tortillas, disposed in multiple rows or lanes, are transported to a pickup area where they may be manually bagged or moved into a single row on a conveyor for delivery to packaging. Bagging systems are known that will automatically process a single row of stacks of tortillas on a conveyor, automatically inserting the stacks into bags.

The latter manual step is repetitive and inefficient. However, heretofore it has been necessary to accomplish this task by hand for several reasons. First, the stacks of tortillas exit the stacking apparatus in multiple rows or lanes, and in a substantially random order. The irregular ordering is due to irregular placement of the tortillas prior to cooking, inspection, and removal of defective products, and similar factors. Also, typically, the size of the stacks, as well as the diameter of the tortillas, may be adjustable for a given apparatus. It is more difficult to move stacked product in an automated manner due to the tendency of the stacks to tip over (or slidably spread out) due to inertial forces and the like.

Recognizing the need for an apparatus for automatically transferring stacks of tortillas from a multi-row stacker to a single-row conveyor, U.S. Pat. No. 6,454,518, to Garcia-Balleza et al., discloses an apparatus wherein stacks of tortillas are dropped from an upper conveyor onto conveyor blocks disposed on an lower conveyor. Although the disclosed device is an improvement on the art, a disadvantage of the invention taught therein is that the stacks of tortillas may become unstacked due to the abrupt drop onto a moving block. Another disadvantage is that the disclosed system does not appear to be amenable to use with more than one size of tortilla. Garcia-Balleza et al. shows many conventional aspects of suitable conveyor systems, and is therefore also incorporated herein by reference.

Therefore, there remains a need for an apparatus that automatically transfers stacked food product arriving in multiple rows onto a conveyor in a single row.

SUMMARY OF THE INVENTION

The present invention is directed to a conveyor transfer apparatus for stacks of flat product, such as stacks of corn and/or flour tortillas. As stacks arrive, typically in multiple rows and at irregular intervals, a first conveyor receives the stacks and transports them on a conveyor having a plurality of parallel, spaced-apart, endless loop belts. The belts define a plurality of gaps therebetween that accommodate an elevator assembly that lifts the stacks from the first conveyor. The elevator assembly, located generally below the first conveyor, includes a plurality of parallel, spaced members that cooperatively define a lift platform, and a vertical actuator that moves the lift platform between a down position wherein the lift platform is intermeshed with the parallel belts, and an up position wherein the lift platform is above the first conveyor. The elevator assembly is adapted to lift one or more stacks of flat product from the first conveyor. A second conveyor is elevated with respect to the first conveyor, and oriented transversely to the first conveyor. The near edge of the second conveyor is near the lift platform when the lift platform is in the up position. A pusher assembly, including a pusher plate and a horizontal actuator, is positioned near the lift platform when the lift platform is in the up position, such that the pusher assembly selectively pushes the elevated stack off of the lift platform and onto the second conveyor.

In an embodiment of the invention, the conveyor transfer apparatus includes a plurality of elevator assemblies and a plurality of pusher assemblies.

In an embodiment of the invention, the pusher assemblies include one or more guide rods that are attached to the pusher plate of the pusher assembly.

In an embodiment of the invention, the lower edge of the pusher plates includes a number of indents that are spaced to accommodate one or more of the lift platform elongate members, such that a portion of the pusher plates extends between adjacent elongate members.

In an embodiment of the invention, the elongate members include an angled-back portion that is operable to stop the progress of certain approaching stacks on the first conveyor when the elevator assembly is in the up position.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 5A–5C are side views of the conveyor transfer apparatus shown in FIG. 1, and showing the sequence of steps in transferring a stack of product from a first conveyor to a second conveyor.

DETAILED DESCRIPTION OF THE PREFERRED EMBODIMENT

Referring now to the figures, wherein like numbers indicate like parts, a description of a preferred embodiment of the present invention is described in detail to illustrate the invention and to aid the artisan in understanding the present invention.

Figure 1:
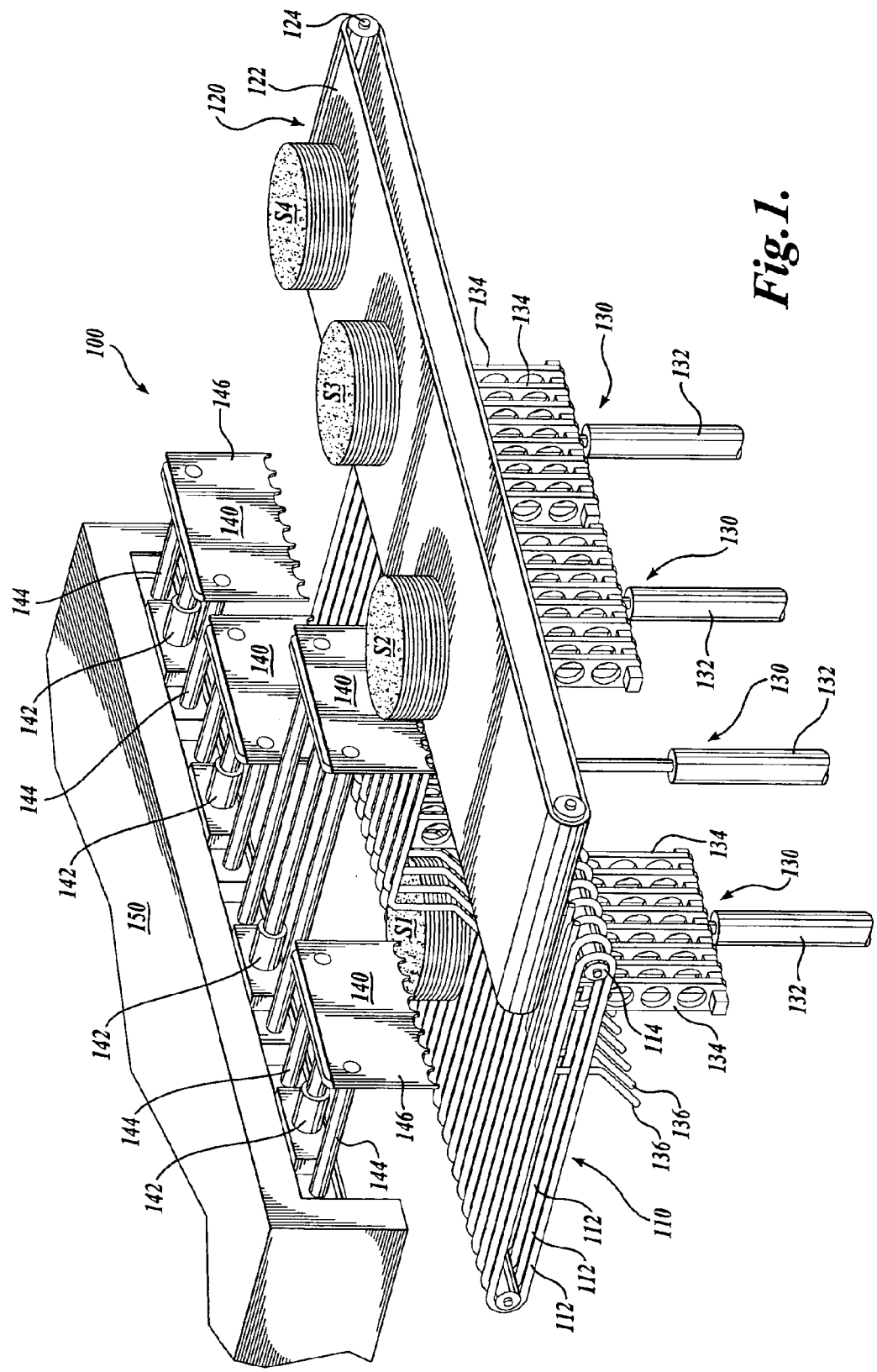
FIG. 1 is a perspective view of an embodiment of a conveyor transfer apparatus according to the present invention.

FIG. 1 shows a simplified perspective view of a conveyor transfer apparatus 100 as an exemplary embodiment of the present invention, wherein conventional and well-known structures, such as support structure and drive mechanisms, are removed in order to better show novel aspects of the invention. The conveyor transfer apparatus 100 receives stacks S1, S2, S3, S4 of flat product, such as corn or flour tortillas, from an upstream processing apparatus—for example, from the out-feed conveyor of a counter/stacker apparatus (not shown). In certain conventional tortilla production facilities, individual tortillas are formed in an array on a relatively wide conveyor, and cooked in a continuous process as they pass through an oven apparatus. The individual tortillas are then stacked, each stack containing a desired number of tortillas. Tortilla cooking and counting/stacking apparatuses are well known in the art. It is contemplated that the present conveyor transfer apparatus may be used, for example, closely downstream of a counting/stacking apparatus. Multiple rows or lanes of irregularly spaced stacks are typically not convenient for downstream processing of the stacks, such as bagging.

Referring again to FIG. 1, a multi-row conveyor 110 is shown that receives stacks S1, S2, S3, S4 of food products, such as tortillas, and transports them toward a single-row conveyor 120. The multi-row conveyor 110 includes a number of parallel, spaced-apart, endless-loop belts 112 that are drivably engaged by a conventional drive mechanism 114 (partially shown). The parallel belts 112 define gaps therebetween that are aligned with the direction of belt 112 travel, while still providing a suitable moving surface for transporting the product. Such conveyors are well known in the industry, and an example of a suitable conveyor and drive mechanism is shown, for example, in U.S. Pat. No. 4,530,632, which is hereby incorporated by reference.

The single-row conveyor 120 is located near the distal end of the multi-row conveyor 110 and elevated relative to the multi-row conveyor 110. The single-row conveyor 120 is oriented transversely to the multi-row conveyor 110, and is adapted to receive the stacks S1, S2, S3, S4 from the multi-row conveyor 110, as discussed in more detail below. The single-row conveyor 120 includes a conveyor belt 122 that may be of any suitable design, as is well known in the art, such as the flexible, unitary conveyor belt shown in FIG. 1. The conveyor belt 122 is preferably drivably engaged by a conventional drive mechanism 124 (partially shown).

The conveyor transfer apparatus 100 includes a plurality of stack elevator systems 130 (four shown) located near the distal end of the multi-row conveyor 110. The elevator systems 130 selectively lift the stacks S1, S2, S3, S4 from the multi-row conveyor 110 into position to be pushed onto the single-row conveyor 120. Each elevator system 130 includes a vertical actuator 132, such as a hydraulic, pneumatic, or electric actuator. In a currently preferred embodiment the actuator is electrically powered, utilizing an electric servomotor. This embodiment provides precise control of the position of the vertical actuator 132. Each vertical actuator 132 drivably engages a number of parallel, spaced-apart upright members 134. The upright members 134 are spaced and positioned to pass between adjacent belts 112 of the multi-row conveyor 110 when the upright members 134 are raised by the corresponding vertical actuator 132 from a down position to an up position. An elongate platform member 136 is attached to the distal end of each upright member 134. The platform members 136 are also parallel, spaced-apart members adapted to transit in the gap between adjacent belts 112 of the multi-row conveyor 110. As discussed in more detail below, the platform members 136 cooperatively form a floor or platform for the elevator system 130 for lifting the stacks S1, S2, S3, S4 from the multi-row conveyor 110.

It will be apparent to persons of skill in the art that the actuation of the elevator systems 130 may be triggered in a variety of ways. Preferably, each elevator system 130 includes a detector 160 (see FIGS. 5A–5C), such as an optical detector, that detects when a stack is in position to be raised from the multi-row conveyor 110 by the associated elevator system 130. Other types of detectors may alternatively be used, including for example mechanical detectors or switches, thermal detectors, and the like. It is also contemplated that other techniques for determining when a stack is in position to be lifted may alternatively be used. For example, the position of the stacks may be known from upstream operations and calculated using the known speed of the multi-row conveyor 110, or if the in-feed of stacks is sufficiently regular, the elevator systems 130 may be activated on a regular basis.

A number of pusher assemblies 140 are located above the multi-row conveyor 110. Preferably, although not necessarily, each pusher assembly 140 is associated with a single corresponding elevator system 130. The pusher assemblies 140 are disposed horizontally and may be supported by a conventional actuator support structure 150. Each pusher assembly 140 includes a horizontal actuator 142 for selectively moving the pusher assembly between a retracted position and an extended position. The horizontal actuator 142 may be, for example, a hydraulic, pneumatic, or electric linear actuator. In a currently preferred embodiment the actuator is electrically powered, utilizing an electric servomotor. This embodiment provides precise control of the position of the horizontal actuator 142. A pusher plate 146 is attached to the distal end of the horizontal actuator 142, and one or more guide rods 144 (two shown for each pusher assembly 140) may also be slidably supported in the support structure 150 and attached to the pusher plate 146. The pusher assemblies 140 are adapted to selectively push one or more stacks from the corresponding elevator system 130 to the single-row conveyor 120.

Figure 2:
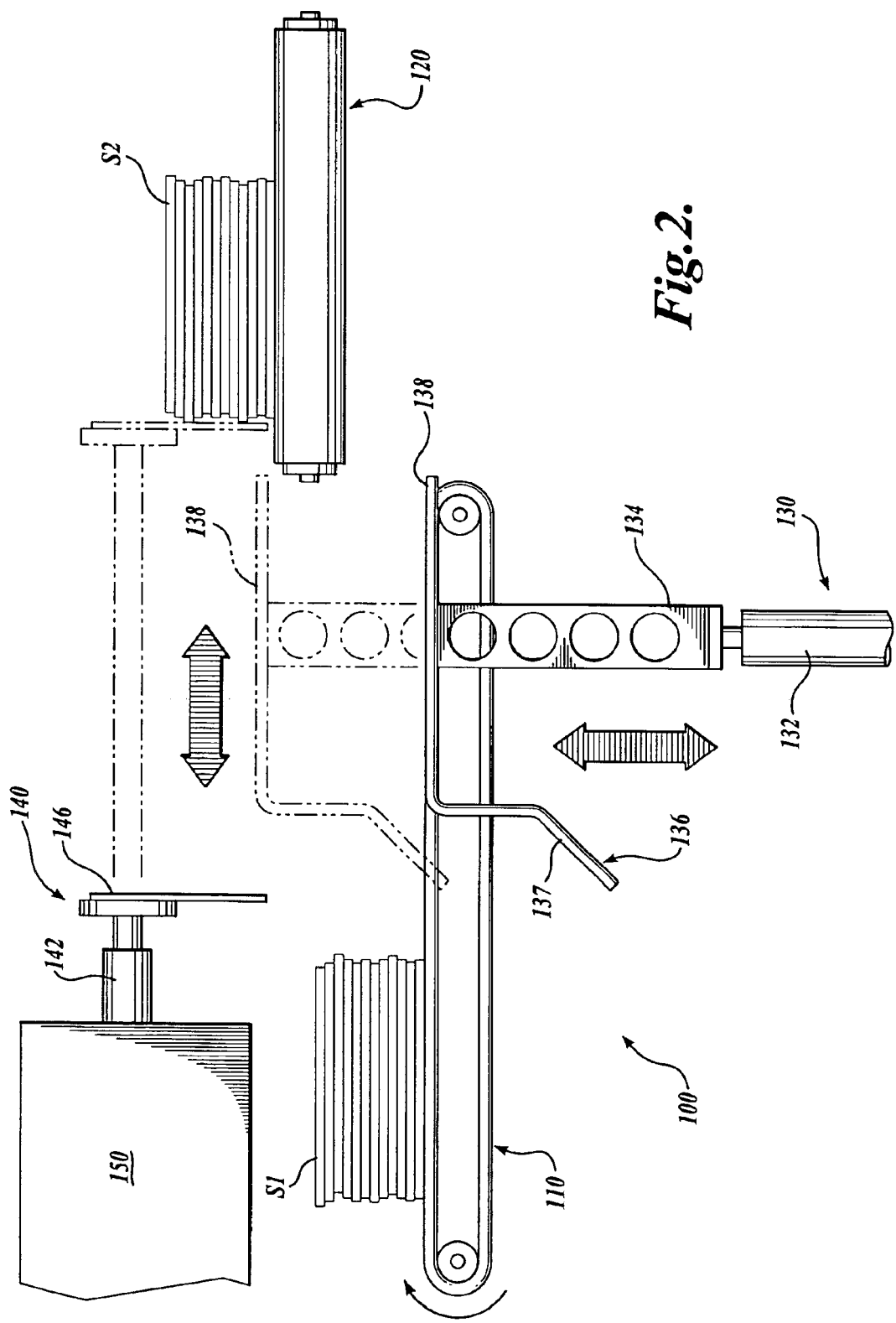
FIG. 2 is a side view of the conveyor transfer apparatus shown in FIG. 1.
Figure 3:
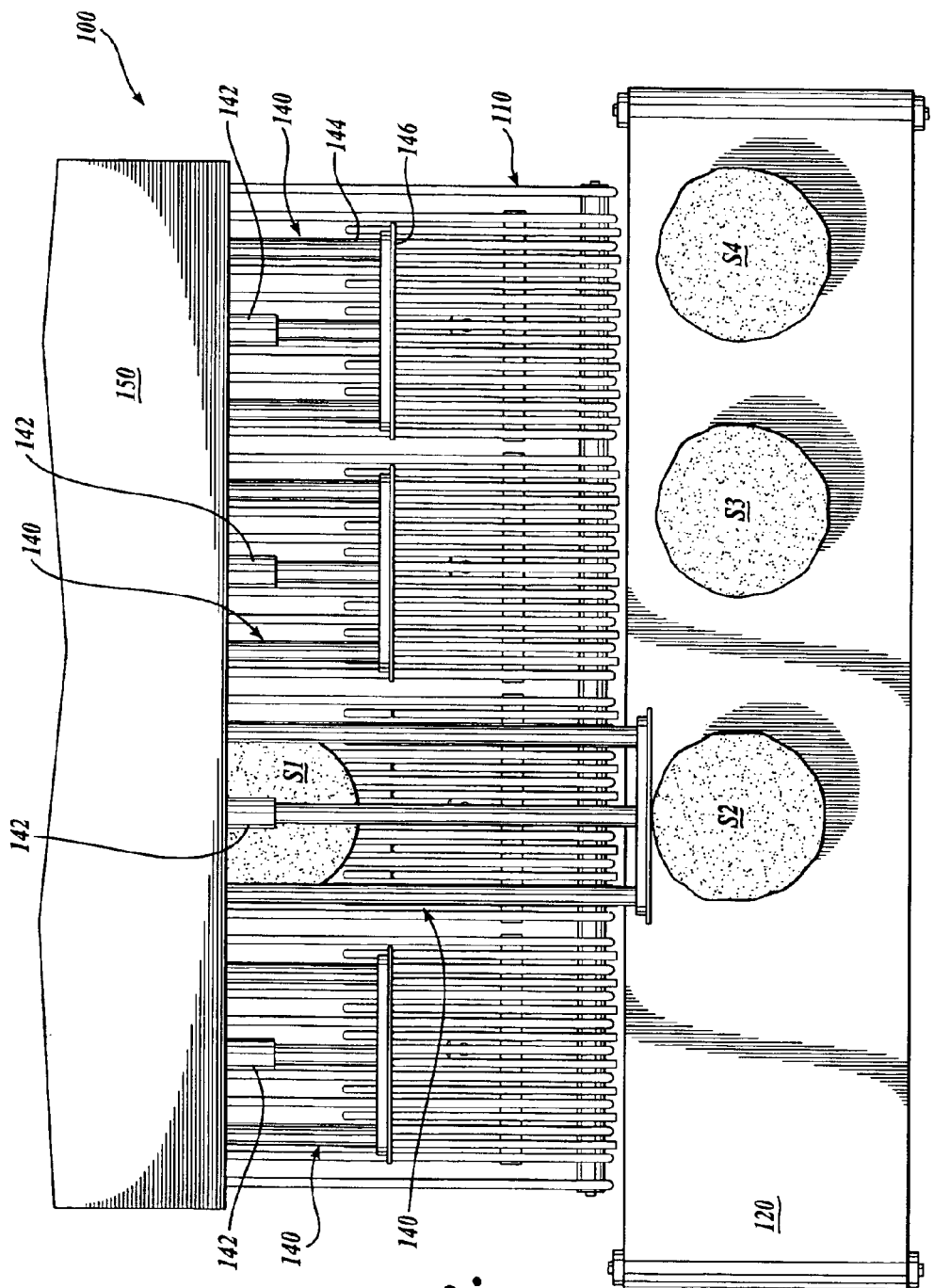
FIG. 3 is a plan view of the conveyor transfer apparatus shown in FIG. 1.

The elevator system 130 and pusher assembly 140 will now be described in more detail, with reference to FIGS. 2–4. FIG. 2 illustrates a side view of the conveyor transfer apparatus 100 shown in FIG. 1, showing an elevator system 130 in the down position. (The elevator system 130 in the up position is indicated in phantom.) FIG. 3 shows a plan view of the conveyor transfer apparatus 100 with one pusher assembly 140 in the extended position, and FIG. 4 shows a front view of the conveyor transfer apparatus 100 with one elevator system 130 in the up position.

Figure 4:
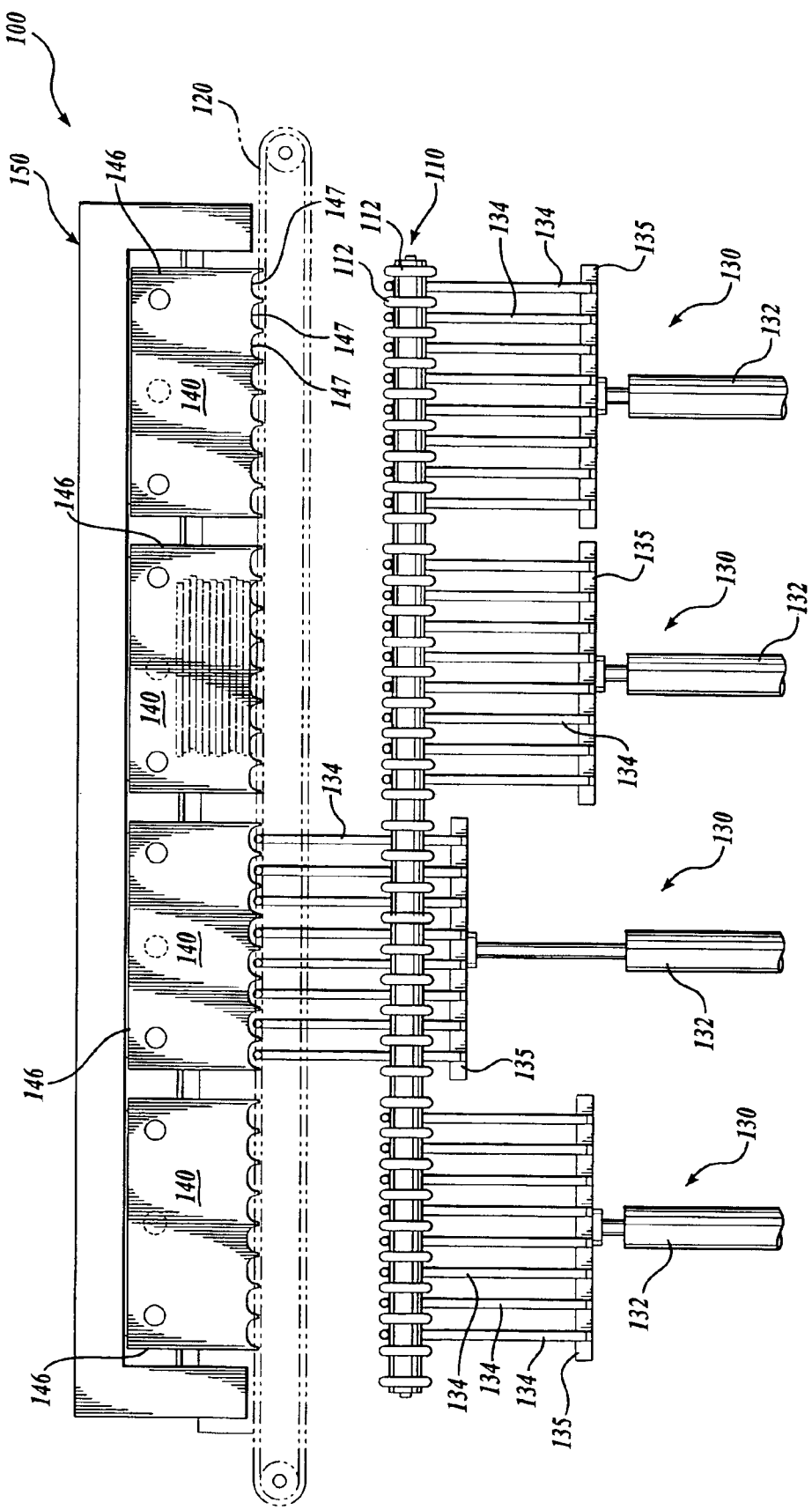
FIG. 4 is a front view of the conveyor transfer apparatus shown in FIG. 1.

As seen most clearly in FIG. 4, in this illustrative embodiment, each elevator system 130 includes eight upright members 134, each upright member fixedly attached to a crossmember 135 that is drivably attached to the vertical actuator 132. The upright members 134 are spaced apart to fit between adjacent belts 112 of the multi-row conveyor 110 without interfering therewith. It will be appreciated that more or fewer upright members 134 may be used, and the upright members 134 may be spaced differently—for example, spaced farther apart to skip gaps between adjacent belts 112—without departing from the present invention.

As seen most clearly in FIG. 2, each platform member 136 that is attached to the distal end of an upright member 134 includes a substantially horizontal front portion 138 and a downwardly-angled back portion 137. When the vertical actuator 132 is in the down position, the front portion 138 of the platform member 136 is approximately at the same level, or slightly lower than, the upper surface defined by the multi-row conveyor 110, such that the platform member 136 does not interfere with the multi-row conveyor 110 transporting the stack S1 (from left to right in FIG. 2). When the elevator system 130 is in the up position, the horizontal front portion 138 of the platform member 136 is approximately at the same level, or slightly higher than, the upper surface defined by the single-row conveyor 120. When the elevator system 130 is in the up position, the distal ends of the platform members 136 are nearly adjacent the nearest edge of the single-row conveyor 120, such that a stack disposed on an elevator system 130 in the up position may be pushed onto the single-row conveyor 120.

It will now be clear that the pusher assemblies 140 are adapted to selectively push stacks S2 of product from the corresponding elevator system 130 onto the single-row conveyor 120. As shown in FIG. 4, the pusher plates 146 of the pusher assemblies 140 preferably include a lower edge having a plurality of serrations or indents 147 that are generally spaced to accommodate the front portion 138 of the platform members 136 for the corresponding elevator system 130, such that a small portion of the pusher plates 146 extends into the gap between adjacent platform members 136. As the horizontal actuator 142 moves from the retracted position (shown in solid in FIG. 2) to the extended position (shown in phantom in FIG. 2), the pusher, plate 146 moves generally parallel to and along the front portion 138 of the platform member 136. It will be appreciated from FIGS. 1 and 2 that the lower edge of the pusher plate 146 must be disposed sufficiently high above the multi-row conveyor 110 such that the stacks, such as stack S1, will pass under the pusher plate 146 without interference.

As seen most clearly in FIG. 3, when the horizontal actuator 142 is in the extended position, the pusher plate 146 is located close to the nearest edge of the single-row conveyor 120, preferably slightly beyond the nearest edge, so that the pusher plate 146 is directly over the single-row conveyor 120. The pusher assembly 140 then pushes the stacks securely onto the single-row conveyor 120.

Figure 5A:
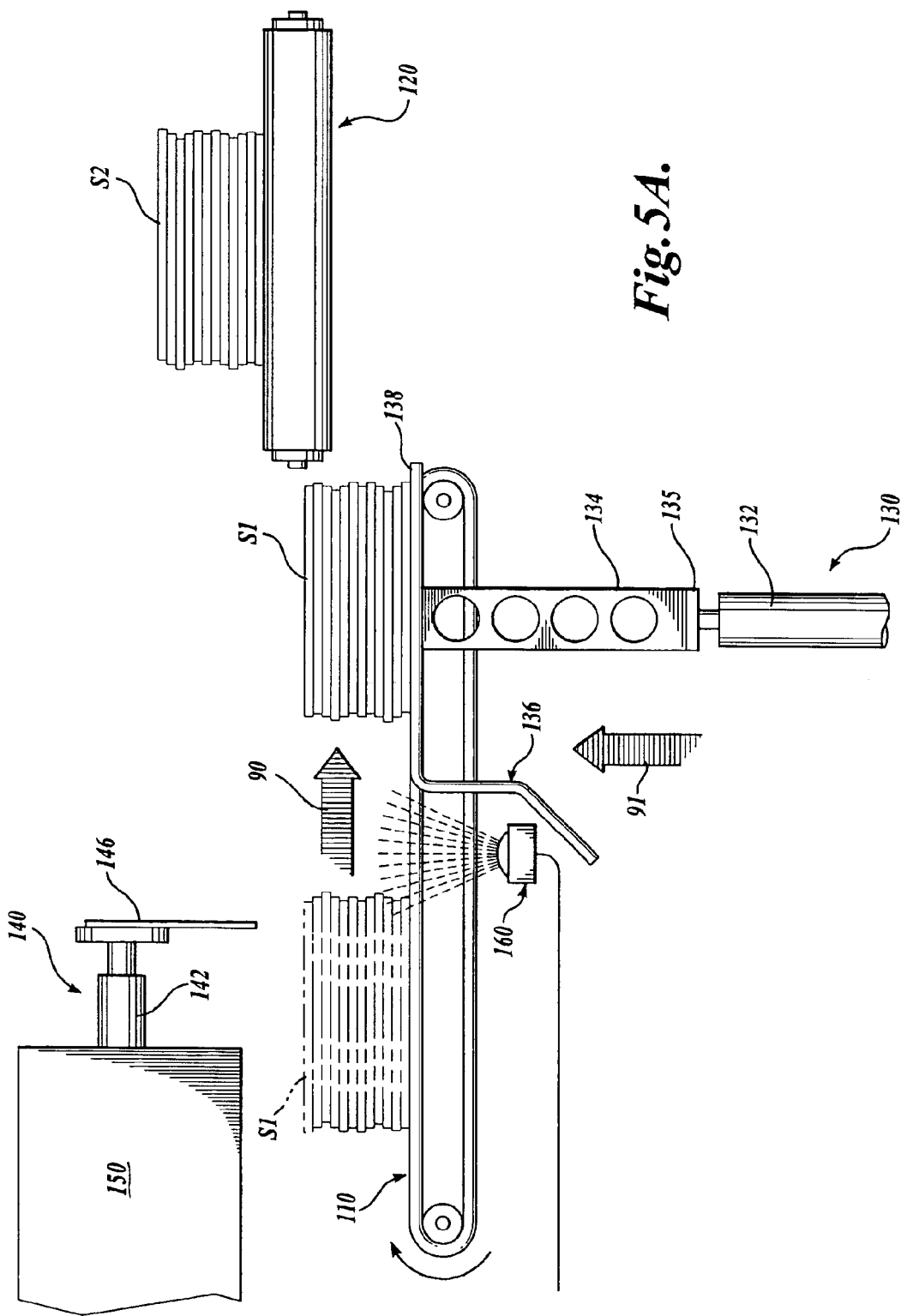

The operation of the conveyor transfer apparatus 100 will now be described with reference to FIGS. 5A–5C. Referring first to FIG. 5A, as the stack S1 moves into position along the multi-row conveyor 110, as indicated by arrow 90, to be transferred to the single-row conveyor 120, its position is determined, for example, by a detector 160. The elevator system 130 is in the down position and, therefore, the platform members 136 do not interfere with transport of the stack S1. When the stack S1 is in the desired position, the elevator system 130 is signaled to rise, as indicated by the arrow 91. Other stacks, such as stacks S2 previously deposited onto the single-row conveyor 120, may continue to be transported by the single-row conveyor 120 without interference.

The stack S1 is lifted from the multi-row conveyor 110 approximately to the level of the upper surface of the single-row conveyor 120, as shown in FIG. 5B. When the stack S1 is in the desired position and a desired space is available on the single-row conveyor 120, the pusher assembly 140 is signaled to move to the extended position, as indicated by arrow 92, to push the stack S1 off of the platform members 136 onto the single-row conveyor 120. If another stack S3 is transported by the multi-row conveyor 110 toward the elevator system 130 while the elevator system 130 is in the up position, the angled-back portion 137 of the platform member 136 will conveniently stop the stack S3 until the elevator system 130 is returned to the down position. It will be appreciated that the angled-back portion 137 of the platform members 136 will mitigate or lessen the frictional forces between stopped stack S3 and the moving multi-row conveyor 110.

Determining the optimal time to signal the pusher assembly 140 to push the stack S1 may be accomplished in many different ways, as will be apparent to persons of skill in the art. For example, detectors may be provided on the single-row conveyor 120 to determine when a space is open to receive the stack S1. In a preferred embodiment, a controller (not shown) receives activation signals from all of the pusher assemblies 140, and uses this information and the known speed of the single-row conveyor 120 to calculate or monitor the location of the stacks that have been deposited on the single-row conveyor 120, at least while the stacks are transiting through the region near the elevator assemblies 130. It will be appreciated that by appropriately timing the activation of the pusher assemblies 140, the stacks may be precisely positioned on the single-row conveyor 120—for example, to achieve uniform spacing of the stacks.

Figure 5C:
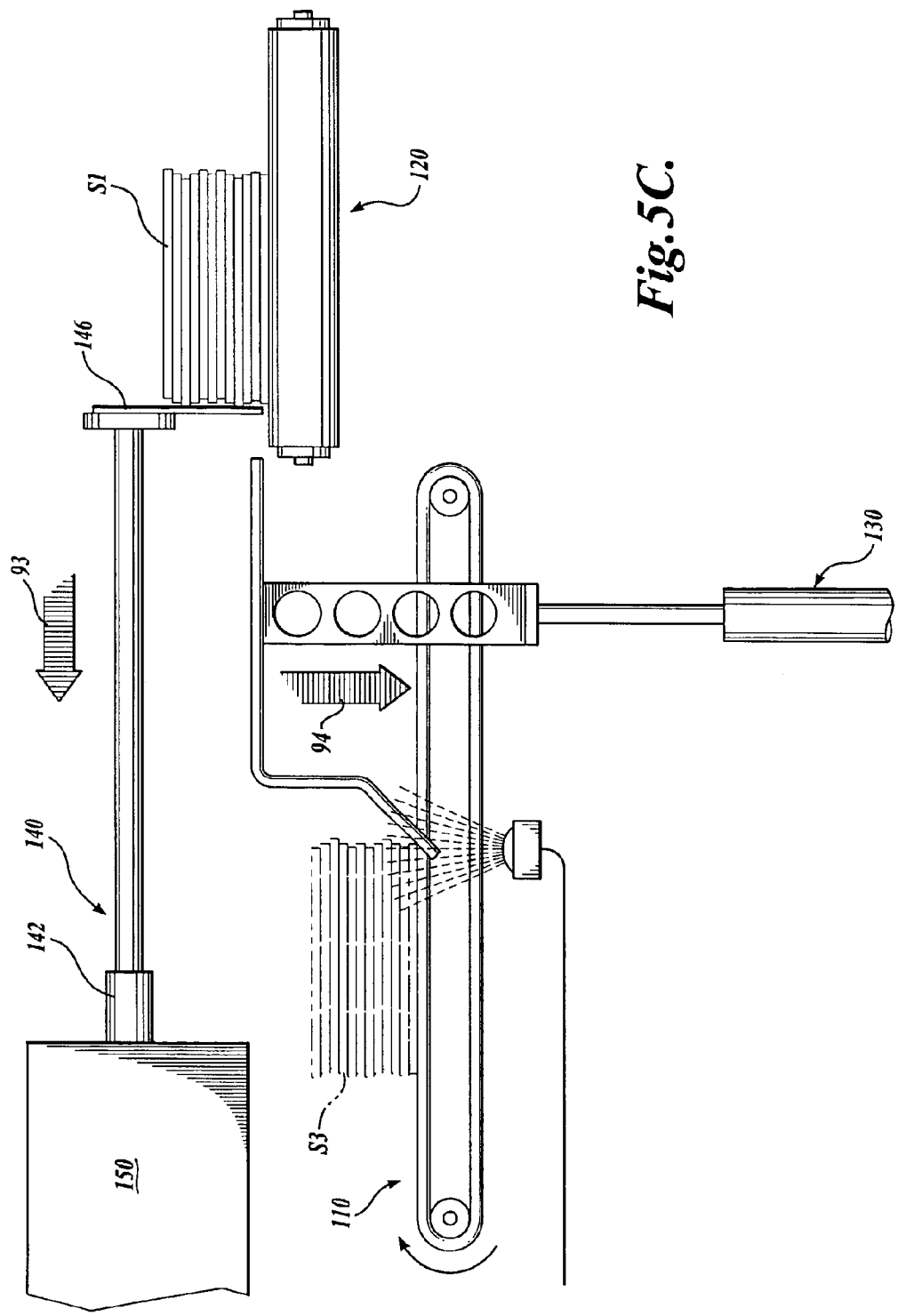

When the stack S1 has been pushed onto the single-row conveyor 120, as shown in FIG. 5C, the pusher assembly 140 is signaled to move to the retracted position, as indicated by arrow 93, and the corresponding elevator system 130 is signaled to move to the down position, as indicated by arrow 94. This sequence is then repeated and replicated in the other lanes, to move the next available stack to the single-row conveyor 120.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A conveyor transfer apparatus comprising:
    a first conveyor adapted to transport a plurality of stacks of flat product, the first conveyor having a plurality of spaced-apart, endless-loop belts defining a plurality of gaps therebetween;
    an elevator assembly including a plurality of elongate members, each elongate member having a horizontal portion positionable in one of the plurality of gaps defined by the first conveyor, wherein the horizontal portions of the plurality of elongate members cooperatively defines a lift platform, and a vertical actuator that is operable to move the lift platform from a down position, wherein the lift platform is disposed near the first conveyor, and an up position, wherein the lift platform is disposed above the first conveyor, whereby the elevator assembly is adapted to lift at least one of the stacks of flat product from the first conveyor;
    a second conveyor disposed at an elevation above the first conveyor and oriented transversely to the first conveyor, the second conveyor having an edge that is disposed near the lift platform when the lift platform is in the up position; and a pusher assembly having a pusher plate and a horizontal actuator that moves the pusher plate along a horizontal path;

wherein the pusher assembly is positionable near the lift platform when the lift platform is in the up position, and further wherein the pusher plate adapted to push the at least one stack of flat product lifted by the lift platform from the lift platform onto the second conveyor.

2. The apparatus of claim 1, wherein the conveyor transfer apparatus comprises a plurality of elevator assemblies and a plurality of pusher assemblies.

3. The apparatus of claim 2, wherein the pusher assemblies further comprise at least one guide rod that is attached to the pusher plate.

4. The apparatus of claim 2, wherein the pusher plate includes a lower edge having a plurality of indents that are spaced to accommodate the horizontal portions of the plurality of elongate members such that a portion of the pusher plate extends below a topmost portion of the lift platform.

5. The apparatus of claim 2, wherein when the horizontal actuator is in the extended position, the associated pusher plate is disposed directly over the second conveyor.

6. The apparatus of claim 2, wherein each elongate member is formed from a cylindrical rod.

7. The apparatus of claim 2, wherein the elongate members further comprise an angled-back portion, and wherein the angled-back portion extends between one of the plurality of gaps in the first conveyor when the lift platform is in the up position.

8. The apparatus of claim 7, wherein the elevator assemblies further comprise a plurality of upright members and a cross member interconnecting the plurality of upright members, the upright members and cross member attaching the elongate members to the vertical actuator.

9. The apparatus of claim 2, wherein in the vertical actuator includes an electric servomotor.

10. The apparatus of claim 2, further comprising a plurality of stack detectors that detect the stacks on the first conveyor.

11. The apparatus of claim 10, wherein the detectors are optical detectors.

12. A conveyor transfer apparatus comprising:

a first conveyor having a proximal end for receiving a plurality of stacks and a distal end, the first conveyor including a plurality of parallel, spaced-apart, endless-loop belts;

a second conveyor disposed near the distal end of the first conveyor, and elevated with respect to the first conveyor;

a plurality of elevator assemblies, each elevator assembly including a vertical actuator and a plurality of vertical members that are drivably connected to the vertical actuator such that the vertical actuator selectively moves the vertical members between an up position and a down position, the vertical members defining a lift platform, and wherein the vertical members extend between adjacent endless loop belts of the first conveyor; and a plurality of pusher assemblies, each pusher assembly associated with one of the plurality of elevator assemblies, the pusher assemblies including a pusher plate and a horizontal actuator that is positioned to selectively move the pusher plate along the associated elevator assembly between a retracted position and an extended position;

wherein the elevator assemblies are operable to lift one of the plurality of stacks from the first conveyor, and the pusher assembly is operable to push the lifted stack from the elevator assembly to the second conveyor.

13. The apparatus of claim 12, wherein the pusher assemblies further comprise at least one guide rod that is attached to the pusher plate.

14. The apparatus of claim 12, wherein the pusher plate includes a lower edge having a plurality of indents spaced to accommodate a distal end of the associated elevator assembly such that a portion of the pusher plate extends below the lift platform.

15. The apparatus of claim 12, wherein when the pusher plate is in the extended position, it is disposed directly over the second conveyor.

16. The apparatus of claim 12, wherein in the vertical actuator includes an electric servomotor.

17. The apparatus of claim 12, further comprising a plurality of stack detectors.

18. The apparatus of claim 17, wherein the stack detectors are optical detectors.

19. A method for automatically arranging stacks of product in multiple rows onto a conveyor in a single row, comprising:

transporting the multiple rows of stacks on a first conveyor, wherein the first conveyor includes a plurality of spaced-apart belts defining gaps therebetween;

lifting the stacks individually from the first conveyor with an elevator assembly having a plurality of vertical members that defines a lift platform, the vertical members being sized and spaced to move vertically in the gaps between the first conveyor belts to engage the stacks; and pushing the lifted stacks off of the lift platform with a pusher assembly onto a second conveyor that is located near the lift platform, wherein the second conveyor is oriented transversely to the first conveyor.

20. The method of claim 19, wherein a plurality of elevator assemblies is disposed side by side, the elevators adapted to lift stacks in a particular row.

21. The method of claim 20, further comprising the step of detecting when a stack of flat product is in position to be lifted by an elevator assembly.

22. The method of claim 21, wherein the stack is detected with an optical detector.

23. The method of claim 22, wherein the elevator assembly utilizes a vertical actuator and the pusher assembly utilizes a horizontal actuator.

24. The method of claim 22, wherein the pusher assemblies push the lifted stacks such that the stacks on the second conveyor are approximately evenly spaced.

* * * * *

UNITED STATES PATENT AND TRADEMARK OFFICE
CERTIFICATE OF CORRECTION

PATENT NO. : 6,845,860 B1
DATED : January 25, 2005
INVENTOR(S) : E.W. Walker

It is certified that error appears in the above-identified patent and that said Letters Patent is hereby corrected as shown below:

Column 6,
Line 59, "defines a lift" should read -- define a lift --

Column 7,
Line 9, "plate adapted" should read -- plate is adapted --

Column 8,
Line 24, "wherein in the" should read -- wherein the --
Line 39, "defines a lift" should read -- define a lift --

Signed and Sealed this

Twenty-fourth Day of May, 2005

JON W. DUDAS
*Director of the United States Patent and Trademark Office*